United States Patent [19]

Higashihara et al.

[11] Patent Number: 5,109,154
[45] Date of Patent: Apr. 28, 1992

[54] FOCUS DETECTION DEVICE HAVING A PLURALITY OF MEANS FOR FORMING LIGHT PATTERNS PROVIDED AT DIFFERENT DISTANCES FROM THE OPTICAL AXIS

[75] Inventors: Masaki Higashihara; Keiji Ohtaka; Kenji Suzuki, all of Kanagawa; Takeshi Koyama, Tokyo; Yasuo Suda, Kanagawa, all of Japan

[73] Assignee: Canon Kabushiki Kaisha, Tokyo, Japan

[21] Appl. No.: 690,332

[22] Filed: Apr. 26, 1991

Related U.S. Application Data

[63] Continuation of Ser. No. 560,213, Jul. 25, 1990, abandoned, which is a continuation of Ser. No. 352,362, May 16, 1989, abandoned.

[30] Foreign Application Priority Data

May 16, 1988 [JP] Japan .............................. 63-118814

[51] Int. Cl.$^5$ .............................................. G01J 1/20
[52] U.S. Cl. ................................ 250/201.8; 354/407
[58] Field of Search .......... 250/201 PF, 201 R, 201.8; 354/406, 407, 408; 356/1, 4

[56] References Cited

U.S. PATENT DOCUMENTS

4,370,551  1/1983  Fukuhara et al. .................. 250/201
4,547,663  10/1985 Kitagishi et al. .................. 250/201

Primary Examiner—David C. Nelms
Attorney, Agent, or Firm—Fitzpatrick, Cella, Harper & Scinto

[57] ABSTRACT

A focusing detecting device is disclosed having apparatus for forming object light patterns whose relative position changes in conformity with a focus state of an objective lens. Light flux passes through different areas of an exit pupil of the objective lens, and circuitry receives and photoelectrically converts the light patterns, and detects the focus state of the objective lens on the basis of the photoelectrically converted signal. The focusing apparatus accroding to the present invention a plurality of sets of structures for forming light patterns and means for photoelectrically converting the light patterns which are provided at different distances from the position of the optic axis of the objective lens. Also disclosed are means for making (a) the shapes of the areas of the exit pupil through which the light flux is passed to form the light patterns, or (b) intervals between the centers of gravity of said areas, or (c) both, different between a position in the vicinity of the optic axis of the objective lens, and a position distant therefrom.

12 Claims, 7 Drawing Sheets

FOCUS DETECTION DEVICE HAVING A PLURALITY OF MEANS FOR FORMING LIGHT PATTERNS PROVIDED AT DIFFERENT DISTANCES FROM THE OPTICAL AXIS

This application is a continuation of application Ser. No. 560,213, filed Jul. 25, 1990, which is a continuation of Ser. No. 352,362, filed May 16, 1989, now both abandoned.

BACKGROUND OF THE INVENTION

1. Field of the Invention

This invention relates to a focus detecting device, and in particular to a device suitable for incorporation into a camera.

2. Related Background Art

As one type of focus detecting device of a camera, there is known a device in which the exit pupil of a photo-taking lens is divided into two pupil areas by a focus detecting optical system, two object images formed by light fluxes passed through the pupil areas are received by a photoelectric element array (for example, a CCD sensor array), the focusing state of the photo-taking lens is detected from the output of the photoelectric element array, and the photo-taking lens is driven on the basis of the result of the detection.

Figure 9:
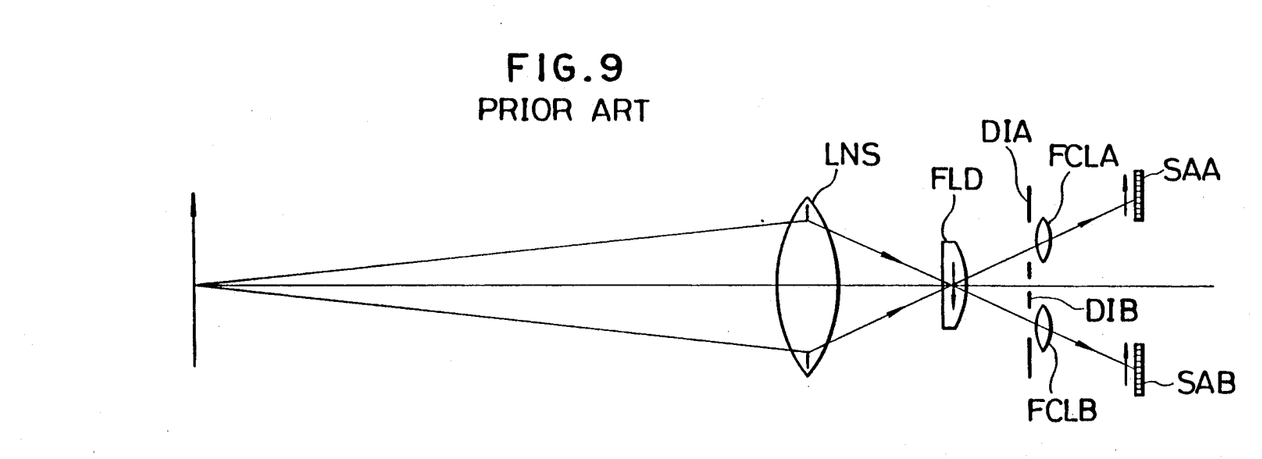
FIG. 9 is an optical cross-sectional view showing a well-known focus detecting system.

Referring to FIG. 9 of the accompanying drawings, a field lens FLD is disposed with its optic axis common to that of a photo-taking lens LNS to be focus-detected. Two secondary imaging lenses FCLA and FCLB are disposed rearwardly of the field lens at positions symmetrical with respect to the optic axis. Sensor arrays SAA and SAB are disposed rearwardly of the secondary imaging lenses. Diaphragms DIA and DIB are provided near the secondary imaging lenses FCLA and FCLB, respectively. The field lens FLD substantially images the exit pupil of the photo-taking lens LNS on the exit pupil surfaces of the two imaging lenses FCLA and FCLB. As a result, light fluxes incident on the secondary imaging lenses FCLA and FCLB, respectively, become ones which have emerged from areas of equal dimensions on the exit pupil surface of the photo-taking lens LNS which correspond to the secondary imaging lenses FCLA and FCLB, respectively, and do not overlap each other. When aerial images formed near the field lens FLD are re-imaged on the surfaces of the sensor arrays SAA and SAB by the secondary imaging lenses FCLA and FCLB, the two images on the sensor arrays SAA and SAB change their positions on the basis of the displacement of the positions of the aerial images in the direction of the optic axis. Accordingly, if the displacement (the amount of deviation) of the relative position of the two images on the sensor arrays is detected, the focus-adjusted state of the photo-taking lens LNS can be known.

Figure 10:
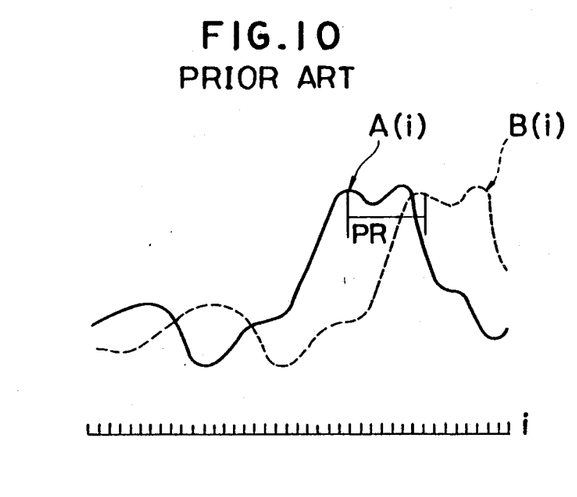
FIG. 10 shows output signals.

FIG. 10 of the accompanying drawings shows an example of the photoelectrically converted outputs of the two images formed on the sensor arrays SAA and SAB. The output of the sensor array SAA is A(i), and the output of the sensor array SAB is B(i). The number of the required picture elements of each sensor is at least five, and desirably several tens or more.

The signal processing method of detecting the amount of image deviation PR from the image signals A(i) and B(i) is disclosed in Japanese Laid-Open Patent Application No. 58-142306, Japanese Laid-Open Patent Application No. 59-107313, Japanese Laid-Open Patent Application No. 60-101513 or Japanese Patent Application No. 61-160824.

The focus adjustment of the photo-taking lens is effected on the basis of the amount of image deviation obtained by the method disclosed in these applications, whereby the photo-taking lens can be brought into an in-focus state.

The method disclosed in one of the above-mentioned applications is, for example, to calculate, for the two image signals A(i) and B(i) (i=1, 2, 3, ..., N), $$V(m) = \sum_i \max\{A(i), B(i + k - m)\} - \sum_i \max\{A(i + k), B(i - m)\} \quad (1)$$

with respect to an integer value m. The range of i in which the sum is taken is determined from the condition that the suffixes i, i+k−m, i+k and i−m must be within a closed section [1,N]. k is an integer constant and usually, k=1. Also, the range of m is concerned with the purpose of detecting the degree of image deviation and is not unconditionally determined, but usually m is varied within the range of $$-\frac{N}{2} \leq m \leq +\frac{N}{2}.$$

The correlation amount defined by the equation (1) is an example, and for any known correlation amount other than this, the following discussion can be equally applied. Besides the equation (1), the following correlation amounts are available:

$$\sum_i \min\{A(i), B(i + k - m)\} - \sum \min\{A(i + k), B(i - m)\}$$

$$\sum_i |A(i) - B(i + k - m)| - \sum_i |A(i + k) - B(i - m)|$$

$$\sum_i |A(i) - B(i + k - m)|^2 - \sum_i |A(i + k - m) - B(i - m)|^2$$

Figure 11:
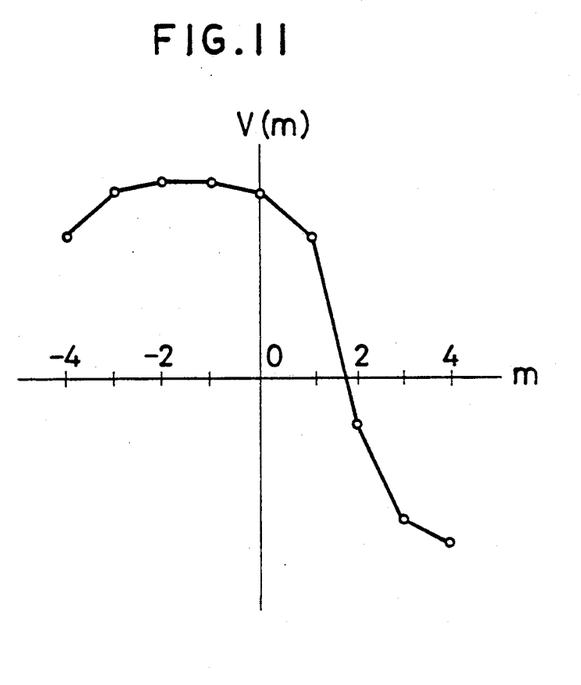
FIG. 11 shows the result of a correlation calculation.

The typical result of the equation (1) being calculated with respect to each m is as shown in FIG. 11 of the accompanying drawings, and the point of m at which V(m) is inverted in sign is the amount of image deviation expressed in units of picture element pitch. Usually this value does not assume an integer.

Assuming that there has been inversion of the sign between $V(m_0)$ NS $V(m_0+1)$, the amount of image deviation $M_0$ including a fraction can be calculated by $$M_0 = m_0 + |V(m_0)/\{V(m_0+1) - V(m_0)\}|.$$

A camera provided with a focus detecting device of this type usually effects automatic focus adjustment to a distance measuring area placed like a spot in the central portion of the photographing picture plane. In a single-lens reflex camera using a 35 mm film, the distance measuring field length in the surface equivalent to the film is usually of the order of 3–4 millimeters or more.

However, when photographing by means of a camera provided with an automatic focus adjusting device as described above, if the main object is not at the distance measuring point at the center of the finder, accurate focus adjustment cannot be accomplished. That is, in a case where the main object is out of the distance measuring area at the center of the finder due to framing or the like, focus adjustment is effected by placing the main object into the distance measuring area at the center of the finder and locking the focus. Then framing is effected while the then focusing state is maintained by the use of the focus lock function or the like, whereafter photographing is effected. Such a photographing method is suitable for a case where the main object is stationary, but in a case where the main object is moving, it is always necessary to effect further focus adjustment and, it is then impossible to effect proper framing.

Also, in the case of a collective photograph or the like in which a plurality of persons or things are to be photographed, if the distance measuring area comes between main objects, focus adjustment is effected to the background. This results in a photograph which is out of focus to the main objects and is contrary to the photographer's intention.

In order to cope with these difficulties, devices have been proposed in which a plurality of focus detecting optical systems are provided and a plurality of distance measuring areas are set in the photographing picture plane, and these distance measuring areas can be selected arbitrarily, as shown in Japanese Laid-Open Patent Application No. 62-47612 and Japanese Laid-Open Patent Application No. 62-189415.

However, in an imaging optical system such as a photo-taking lens, there is generally the phenomenon of vignetting.

Figure 12:
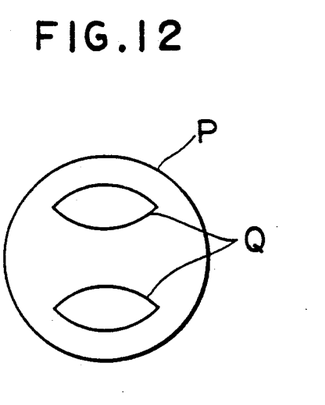
FIGS. 12 and 13 show the shapes of the exit pupil.
Figure 13:
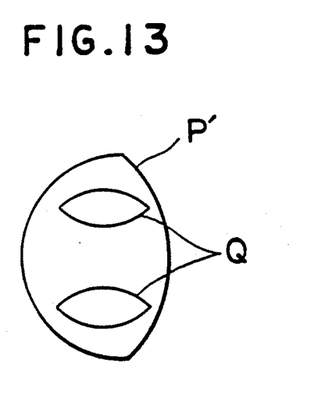

If the optic axis of the photo-taking lens and the photographer's line of vision are coincident with each other when the photo-taking lens is seen from the emergence side of the light flux, the exit pupil looks circular as shown by P in FIG. 12 of the accompanying drawings. In contrast, when the photo-taking lens is seen from an oblique direction, the exit pupil is eclipsed and looks like a partly cut-away circle as shown by P' in FIG. 13 of the accompanying drawings. This is called vignetting.

Vignetting becomes greater and the area of the exit pupil becomes smaller as the objective lens is seen more obliquely, that is, as the objective lens is seen from a position more distant from the position of its optic axis.

Accordingly, where a plurality of distance measuring areas is set and there is a distance measuring area near to the position of the optic axis of the objective lens and a distance measuring area far from the position of the optic axis, when the objective lens is seen from a distance measuring point corresponding to the distance measuring area far from the position of the optic axis, great vignetting occurs. If, as described in connection with FIG. 9, the stop opening is projected onto the exit pupil of the objective lens, Q's in FIGS. 12 and 13 correspond to those areas, and if vignetting becomes greater, there will arise the possibility of these areas being eclipsed.

To cope with the problem noted above, it would be an effective method to predetermine the sizes of these areas in conformity with the situation in which the greatest vignetting occurs, but this method is inconvenient because the ability of the system for effecting detection at the center of the picture plane is limited by the other systems.

SUMMARY OF THE INVENTION

The present invention has as its object to take the above-noted problem of vignetting into consideration and enhance the focus detecting ability near the center of the picture plane which is used most frequently, to thereby improve the overall ability of the present system which is capable of executing distance measurement at a plurality of positions.

The present invention proposes a device which has means for forming object light patterns whose relative positions change in conformity with the focus-adjusted state of an objective lens, from light fluxes including a light flux created at the same position of the object and passed through different areas of the exit pupil of the objective lens and means are provided for receiving and photoelectrically converting the light patterns and for detecting the focus-adjusted state of the objective lens on the basis of the photoelectrically converted signal. A plurality of sets of means are provided for forming light patterns, and means for photoelectrically converting the light patterns are provided at different distances from the position of the optic axis of the objective lens. The state of the areas of the exit pupil through which pass the light fluxes forming the light patterns, for example, the shapes or the intervals between the centers of gravity of such areas, or both are made to differ between the vicinity of the position of the optic axis of the objective lens and a position distant therefrom.

DESCRIPTION OF THE PREFERRED EMBODIMENTS

Figures 1, 2:
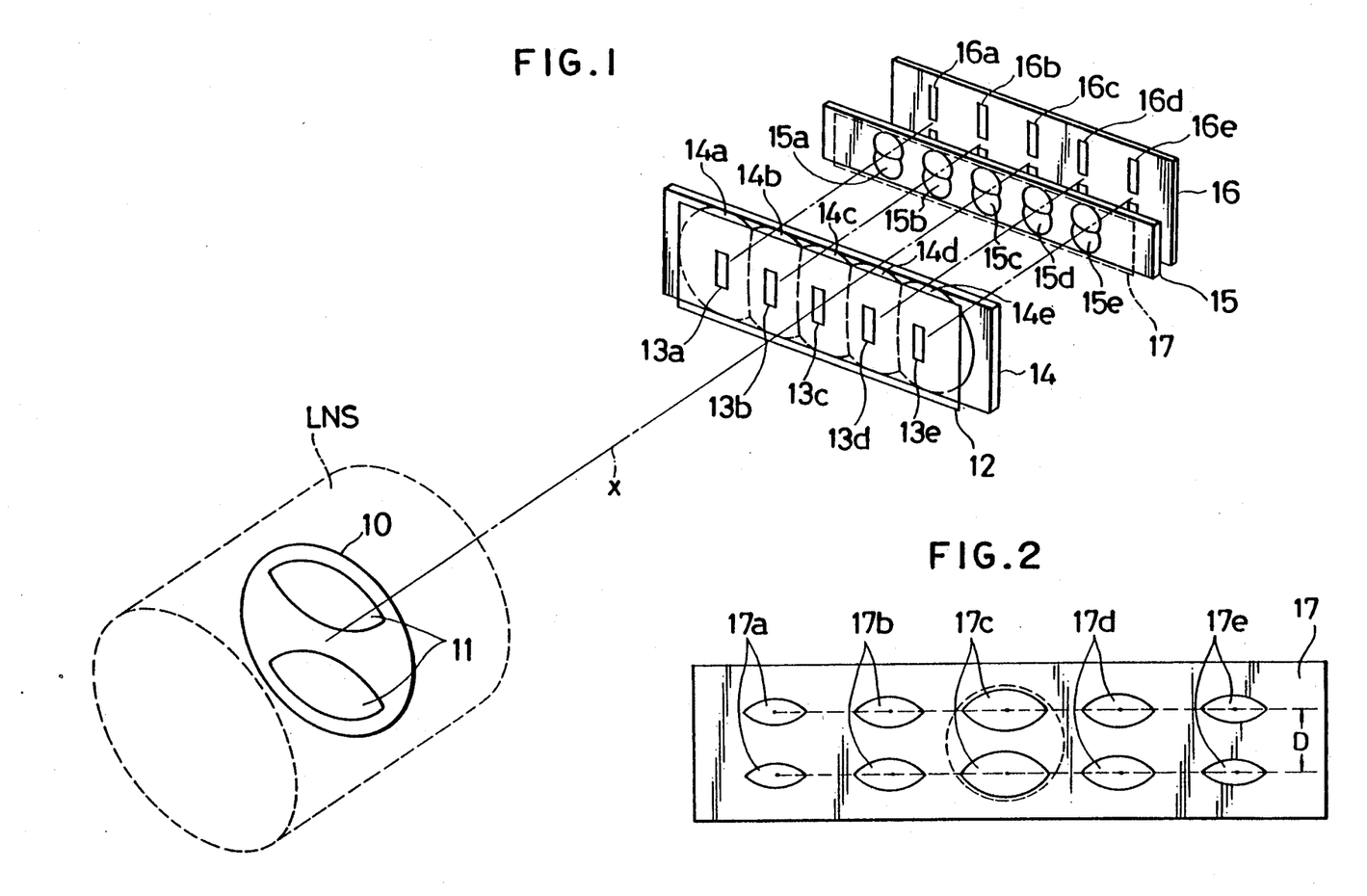
FIG. 1 is an optical perspective view showing a first embodiment of the present invention.
FIG. 2 is a plan view showing a constituent member of the FIG. 1 embodiment.
Figure 3:
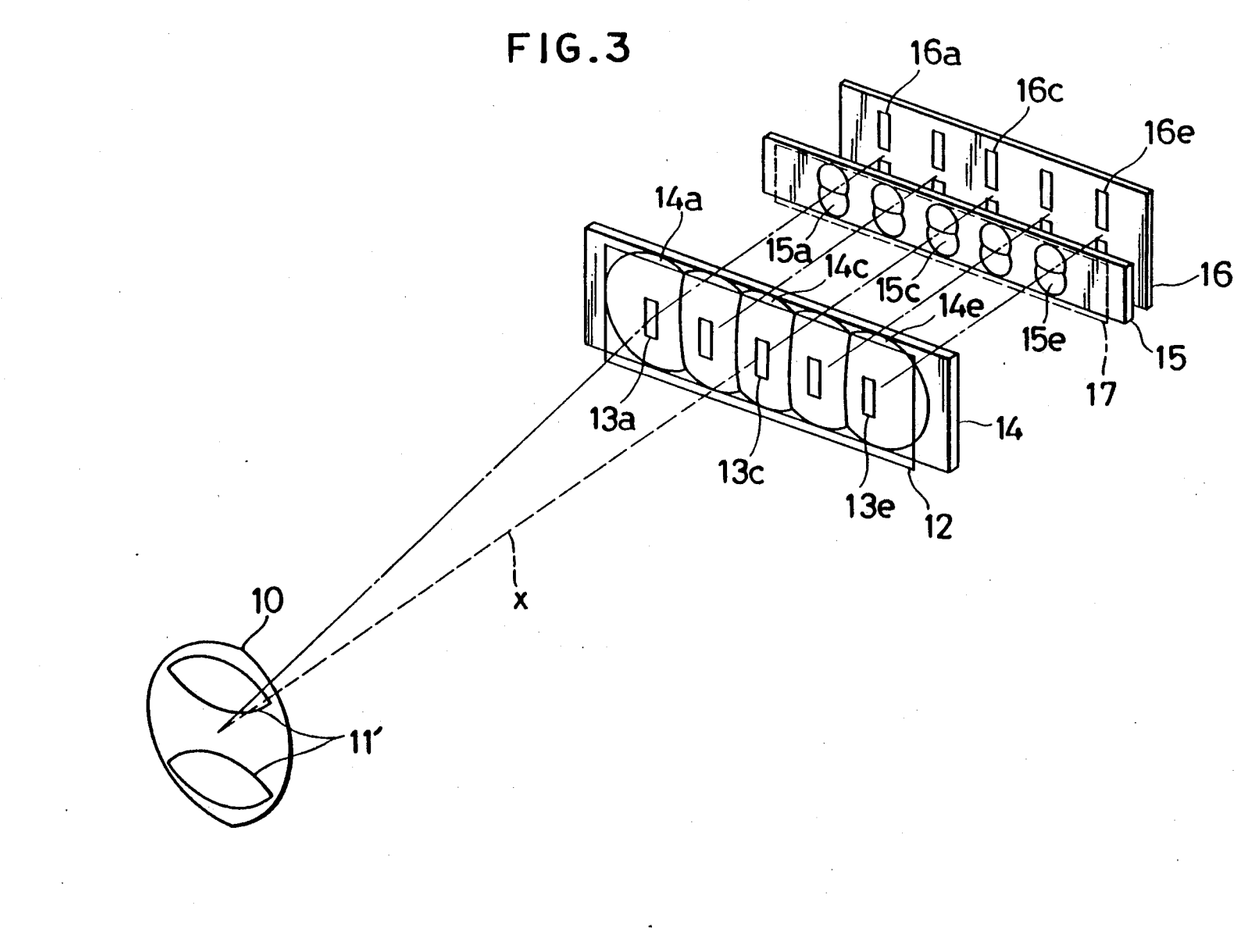
FIG. 3 is another optical perspective view of the first embodiment.

FIGS. 1, 2 and 3 show a first embodiment of the present invention. LNS designates an objective lens, and the reference numeral 10 denotes the exit pupil thereof. The reference numeral 12 designates a field mask formed with a plurality of, e.g. five rectangular openings 13a-13e including an opening 13c positioned on the optic axis x of the objective lens. These openings correspond to distance measuring areas, respectively. The reference numeral 14 denotes a field lens assembly provided with field lenses 14a-14e for the respective openings. The field mask 12 and the field lens assembly 14 are disposed in proximity to each other and near the predetermined focal plane of the objective lens LNS. The reference numeral 15 designates a secondary imaging lens assembly provided with pairs of upper and lower secondary imaging lenses 15a-15e corresponding to the openings 13a-13e in the field mask 12. The reference numeral 16 denotes a photoelectric converting device provided with pairs of upper and lower photoelectric element arrays 16a-16e corresponding to the pairs of imaging lenses 15a-15e. Each pair of photoelectric element arrays can be replaced by a photoelectric element array electrically divided into two.

A member 17 disposed in proximity to the secondary imaging lens assembly 15 is a two-opening stop plate provided with pairs of apricot-stone-shaped openings 17a–17e, as shown in FIG. 2. FIG. 2 is depicted exaggeratively. The interval D between the centers of gravity of each pair of openings, i.e., the base line length, is constant, but the areas of the openings differ between the position near to the optic axis x of the objective lens and the position far from the optic axis x. The positions of the centers of gravity coincide with position of the optic axes of the secondary imaging lenses. It is preferable that the power of each field lens 15a–15e be modified near the center thereof relative to the marginal portion thereof with the areas of the openings taken into account.

In the case of the openings 17c disposed at the position of the optic axis x of the objective lens, vignetting does not occur to the exit pupil at this position and therefore, there is a margin in the exit pupil and it is possible to adopt great dimensions for the openings. The reference numeral 11 in FIG. 1 designates areas in which the pair of openings 17c are reversely projected onto the exit pupil, and a light flux passed through one of these areas passes through one of the openings 17c, and a light flux passed through the other area passes through the other opening 17c.

On the other hand, at the position of the pair of openings farthest from the position of the optic axis x of the objective lens, for example, the pair of openings 17a, the vignetting of the exit pupil becomes great and therefore, the dimensions of such openings are made small. FIG. 3 depicts the manner in which the pair of openings 17a are reversely projected onto the exit pupil 10 by the power of the field lens 14a, and the area 11' is the image of the pair of openings. The exit pupil of FIG. 3, as compared with the exit pupil of FIG. 1, is small due to vignetting, and the size of the area 11' is also reduced. However, as mentioned above, the base line length is the same and therefore, although it is difficult to improve the detection accuracy itself thereby, the focus detecting ability of the central area of the picture plane for an object of low luminance can be improved greatly.

That is, the light fluxes coming from the object field are once imaged near the field mask 12 and the field lens assembly 14 by the objective lens LNS, and of those light fluxes, the light flux passed through the opening 13c passes through the pair of openings 17c in the two-opening stop plate 17, and forms light patterns of the object on the pair of photoelectric element arrays 16c by the action of the pairs of secondary imaging lenses 15c. The relative positional relation of these light patterns varies in conformity with the focus-adjusted state of the objective lens, as already described with reference to FIG. 9, and a value indicative of the focus-adjusted state is calculated by a calculation processing circuit, not shown, by the use of an electrical signal output from the photoelectric converting device 16.

Light fluxes passed through the other openings 13a, 13b, 13d and 13e in the field mask 12 also form light patterns on the pairs of photoelectric element arrays by an action similar to what has been described above, and these light patterns are used for the calculation of values indicative of the focus-adjusted states of the objective lens for objects caught by the respective distance measuring areas. At that time, the quantity of light of the light pattern formed on the photoelectric element array by the light flux passed through the opening 13c in the field mask 12 increases correspondingly to the increase in the size of the openings in the two-opening stop plate, and can readily improve the low luminance limit for focus detection.

Figures 4, 5:
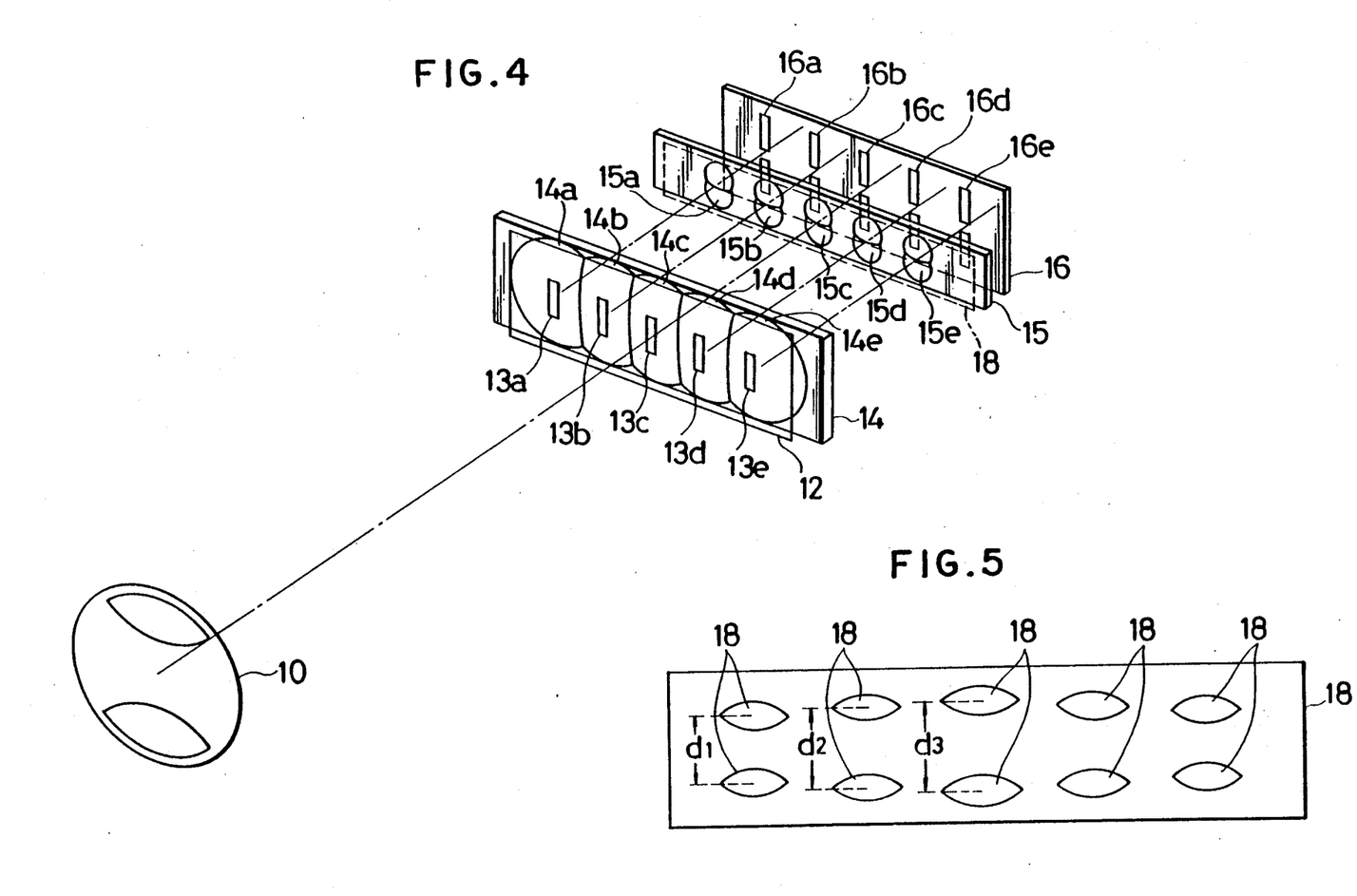
FIG. 4 is an optical perspective view of a second embodiment of the present invention.
FIG. 5 is a plan view showing a constituent member of the FIG. 4 embodiment.

A second embodiment of the present invention will now be described with reference to FIGS. 4, 5 and 6. In these figures, members similar to those shown in FIG. 1 are given similar reference characters. In the present embodiment, a two-opening stop plate 18 has the size of its openings 18a–18e made constant, but has the intervals between the centers of gravity of its openings changed, as shown in FIG. 5. That is, the interval $d_3$ between the centers of gravity of the pair of openings 18c near to the position of the optic axis of the objective lens is made great as compared with the interval $d_1$ between the centers of gravity of the pair of openings 18a far from the position of the optic axis. However, the sizes of the openings are equal.

Figures 6, 7:
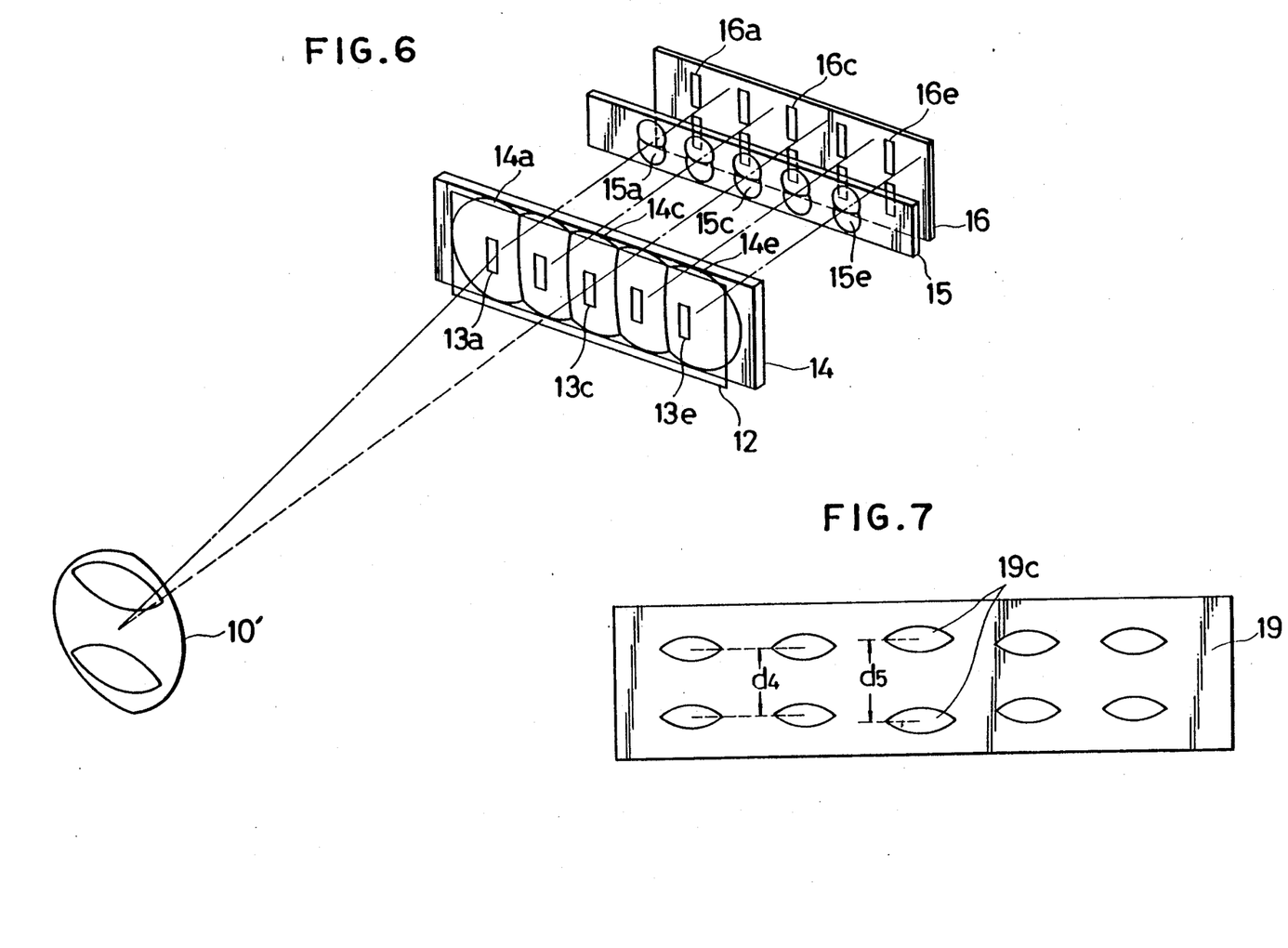
FIG. 6 is another optical perspective view of the second embodiment.
FIG. 7 is a plan view showing a constituent member of a third embodiment of the present invention.

As a result, as will be seen from the comparison between the area on the exit pupil 10 of FIG. 4 and the area on the exit pupil 10' of FIG. 6, the sizes of the two areas are equal, but the intervals between the centers of gravity differ from one another, and in the focus detecting system on the optic axis of the objective lens, the interval between the centers of gravity of the areas is great as compared with that of the other areas and therefore, the detection accuracy at the center of the picture plane can be readily enhanced. Here, the image formed at a position far from the center of the picture plane becomes greater in F-number due to the vignetting of the objective lens than at the center of the picture plane. That is, at a location far from the center of the the picture plane, the depth of image plane becomes deeper and further, a reduction in the imaging performance due to the aberrations of the lens occurs. Therefore, between the images formed at the center of the picture plane and a location far from the center of the picture plane, there is a difference in focus detection accuracy, and it a very efficient means both in terms of design and performance to enhance the detection accuracy of the focus detecting system which measures distance at the center of the picture plane, as in the present embodiment. Also, if the detection accuracy is reduced a little and photoelectric elements of the same sensitivity are used, there will be obtained a system capable of detecting a wider range of defocus amounts (wider in the prediction range).

FIG. 7 shows a two-opening stop plate for another embodiment. In this stop plate 19, the areas of a pair of openings 19c located at the position of the optic axis of the objective lens and the interval $d_5$ between the centers of gravity thereof are increased as compared with those of the other pairs of openings. This two-opening stop plate is disposed near the secondary imaging lens assembly. Thereby, the detecting system positioned on the optic axis of the objective lens is improved both in detection accuracy and low luminance detecting ability.

Figure 8A:
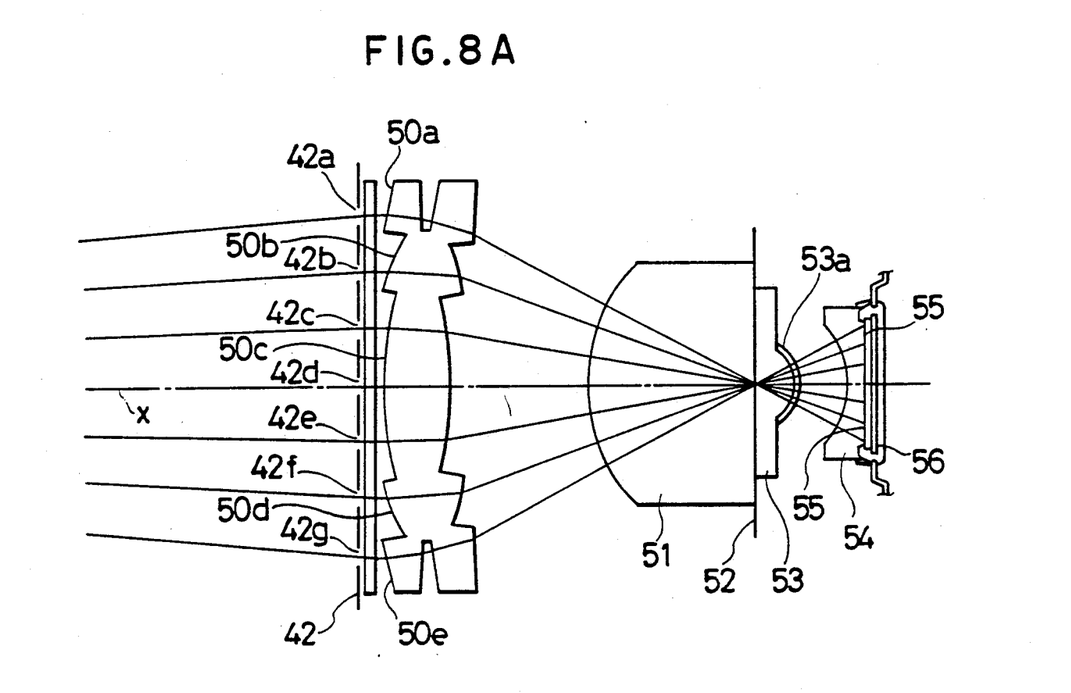
FIG. 8A is an optical cross-sectional view for illustrating another embodiment of the present invention.
Figure 8B:
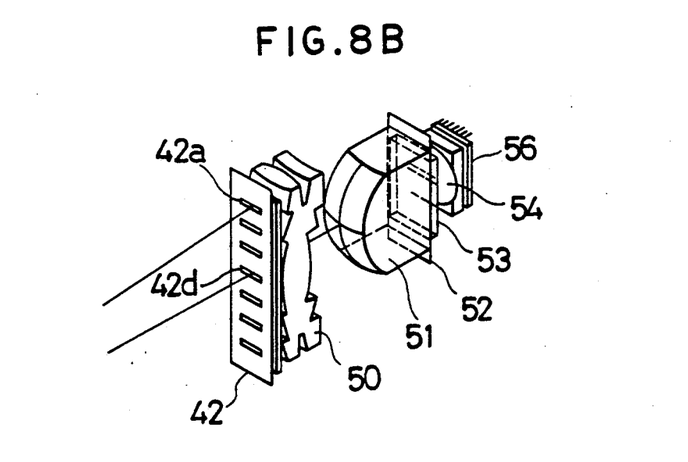
FIG. 8B is a perspective view thereof.

FIGS. 8A and 8B relate to another embodiment. This system itself is already proposed in Japanese Patent Application No. 62-279835, and the present invention may utilize this system.

The distance measuring points are regulated by a field mask 42 near the primary imaging plane, and there are openings 42a–42g corresponding in number to the distance measuring points. Light fluxes passed through these openings 42a–42g are re-imaged on photoelectric element arrays on a photoelectric converting device by a dividing field lens 50 and secondary imaging lenses 51 and 53. The secondary imaging lens 53 comprises two juxtaposed convex lenses. At this time, these light fluxes are separated by a stop 52 into two light fluxes passing through exit pupils 81a and 81b, and are imaged on different photoelectric element arrays on the photoelectric converting device. The reference numeral 54 designates an image flattening lens. Focus detection for the distance measuring field image can be accomplished by the relative position of these two images.

The reference numeral 52 denotes a two-opening stop plate provided with openings opposed to the convex lenses of the secondary imaging lens 53. When the openings in the two-opening stop plate are seen from the openings 42a–42g, the sizes of the openings vary from the position of the optic axis of the objective lens, toward the marginal portion. That is, the areas of the openings near the optic axis are large and the areas of the openings farther from the optic axis are smaller. Accordingly, if the refractive powers of the field lenses 50a–50e of the dividing field lens 50 are selected to promote this tendency and the areas through which the light fluxes entering the marginal photoelectric element arrays pass are made small even if vignetting occurs to the objective lens, the light fluxes will not be eclipsed. Conversely, the areas of the openings in the two-opening stop plate can be made correspondingly larger and therefore, in the focus detecting system at the position of the optic axis of the objective lens, detection becomes possible by the light flux passed through the large area of the exit pupil.

While in the embodiments hitherto described, a description has been given of the areas of the exit pupils and the interval therebetween (the base line length), it is apparent that the present invention is effective even in a focus detecting device wherein the low luminance limit and distance measurement accuracy of each focus detecting system are optimized, that is, the shapes of the exit pupils are changed so that the areas of and the interval between the exit pupils satisfy the required specification.

The following effects are provided by changing the shape of the exit pupil of each focus detecting system of the focus detecting device for effecting the distance measurements of a plurality of points, as described above:

1) It becomes possible to enhance the detection accuracy of the focus detecting system which distance-measures the distance measuring point near to the center of the optic axis of the objective lens.

2) It becomes possible to make higher the low luminance limit of the focus detecting system which distance-measures the distance measuring point near to the center of the optic axis of the objective lens.

3) It is possible to form a detecting system which is high in focus detection accuracy and a detecting system in which detection accuracy is reduced a little and the prediction range is widened by the use of the same photoelectric element array, whereby during a great amount of defocus, focus adjustment is effected by the latter detecting system, whereafter focus adjustment of high accuracy becomes possible by the former detecting system and as a result, it becomes possible to form a system which can quickly accomplish focus adjustment of high accuracy.

4) It becomes possible to provide, in a camera requiring systematic interchangeability, such as a single-lens reflex camera, a focus detecting device which has a detecting system having the same focus detecting ability as that of the conventional camera provided with only a central focus detecting device and further is capable of accomplishing focus detection at a plurality of distance measuring points.

5) The image formed at a position far from the center of the picture plane becomes great in F-number due to said vignetting as compared with the image at the center of the picture plane, and as a result, the depth thereof becomes deeper and therefore, there is no problem even if the focus detection accuracy required is reduced. Also, the imaging performance of the off-axis image is reduced by the off-axis aberration of the photo-taking lens and therefore, focus adjustment of high accuracy is not very meaningful. So, a detecting system suitable for each distance measuring point can be designed and thus, a focus detecting device which is totally well balanced can be provided.

We claim:

1. In a focus detecting device having means for forming object light patterns whose relative position changes in conformity with a focus state of an objective lens, from light fluxes passed through different areas of an exit pupil of the objective lens, and means for receiving and photoelectrically converting the light patterns, and which detects the focus state of the objective lens on the basis of the photoelectrically converted signal, apparatus comprising:

a plurality of sets of means for forming light patterns and means for photoelectrically converting the light patterns provided at different distances from the position of the optic axis of the objective lens; and means for making intervals between centers of gravity of the areas of the exit pupil through which the light fluxes pass to form the light patterns different between a position in the vicinity of the optical axis of the objective lens and a position distant therefrom.

2. Apparatus according to claim 1, wherein said plurality of sets of means for forming light patterns comprises a pair of secondary imaging lenses, and wherein said means for making said intervals different comprises a light-interception member disposed near said secondary imaging lenses and having openings therein.

3. A device according to claim 2, wherein an area of an opening near the optic axis is greater than an area of an opening apart from the optic axis.

4. A device according to claim 2, wherein a distance between openings near the optic axis is greater than a distance between openings apart from the optic axis.

5. A device for detecting the focus-adjusted state of an objective optical system, comprising:

field lens means disposed on or near a predetermined imaging plane of the objective optical system and through which a light flux from the objective optical system passes;

a plurality of pairs of imaging lenses each pair forming a pair of light patterns whose relative position changes in conformity with the focus-adjusted state of the objective optical system, from the light flux passed through said field lens means;

light regulating means for regulating the light patterns passing through said imaging lenses, and making a regulated state of said patterns different between (1) a pair of imaging lenses on the optic axis of the objective optical system, (2) a pair of imaging lenses near to the optic axis of the objective optical system, and (3) a pair of imaging lenses far from the optic axis of the objective optical system; and a plurality of sensing means for receiving the regulated plurality of pairs of light patterns, said sensing means each having a plurality of photoelectric elements and forming a signal indicative of the focus-adjusted state of the objective optical system in conformity with the relative position of said regulated light patterns.

6. A device according to claim 5, wherein said light regulating means comprises a mask in which shapes of openings through which the light patterns pass differ between a position near to the optic axis of the objective optical system and a position far from the optic axis of the objective optical system.

7. A device according to claim 6, wherein the openings which are near to said optic axis are larger in area than those openings which are far from said optic axis.

8. A device according to claim 7, wherein said openings become smaller in area away from said optic axis.

9. A device according to claim 5, wherein said light regulating means comprises a mask in which intervals between centers of openings through which the patterns pass differ between a position near to the optic axis of the objective optical system and a position far from the optic axis of the objective optical system.

10. A device according to claim 5, wherein said light regulating means comprises a mask in which shapes of openings through which the light patterns pass and intervals between centers of said openings differ between a position near to the optic axis of the objective optical system and a position far from the optic axis of the objective optical system.

11. A device according to claim 9, wherein a distance between openings near the optic axis is greater than a distance between openings apart from the optic axis.

12. In a focus detecting device having means for forming object light patterns whose relative position changes in conformity with a focus state of an objective lens, from light fluxes passed through different areas of an exit pupil of the objective lens, and means for receiving and photoelectrically converting the light patterns, and which detects the focus state of the objective lens on the basis of the photoelectrically converted signal, apparatus comprising:

a plurality of sets of means for forming light patterns and means for photoelectrically converting the light patterns provided at different distances from the position of the optic axis of the objective lens; and means for making (1) shapes of the areas of the exit pupil through which the light fluxes pass to form the light patterns and (2) intervals between centers of gravity of said areas, different between a position in the vicinity of the optic axis of the objective lens and a position distant therefrom.

* * * * *

UNITED STATES PATENT AND TRADEMARK OFFICE
CERTIFICATE OF CORRECTION

PATENT NO. : 5,109,154

DATED : April 28, 1992

INVENTOR(S) : Masaki Higashihara, et al.

It is certified that error appears in the above-identified patent and that said Letters Patent is hereby corrected as shown below:

On the title page item:
(56): References Cited

U.S. Patent Documents, insert --4,908,504 3/1990 Karasaki et al.--.

Column 8, line 36, "optical" should read --optic--.

Signed and Sealed this

Twenty-second Day of February, 1994

Attest:

BRUCE LEHMAN

Attesting Officer  Commissioner of Patents and Trademarks